United States Patent Office 2,901,261
Patented Aug. 25, 1959

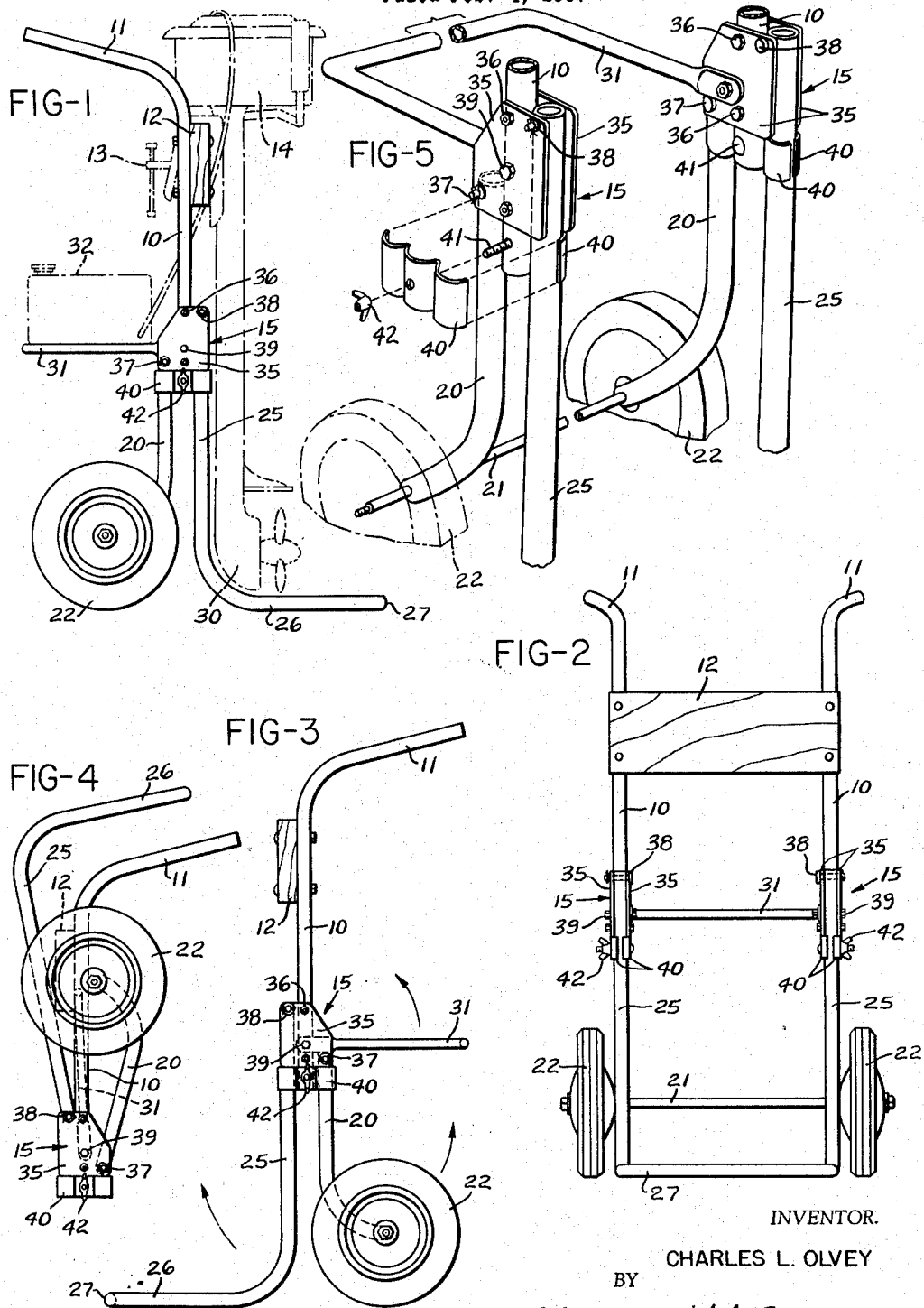

2,901,261

COLLAPSIBLE CART

Charles L. Olvey, Piqua, Ohio, assignor to The Wood Shovel and Tool Company, Piqua, Ohio, a corporation of Ohio Application February 4, 1957, Serial No. 637,950

7 Claims. (Cl. 280—36)

This invention relates to a collapsible cart and, more particularly, to a collapsible cart adapted for carrying an outboard motor thereon and to be collapsed to a size which will conveniently fit into the back seat or luggage compartment of an automobile.

Outboard motors are frequently heavy and unwieldy devices, the transportation of which by hand is difficult. Yet owners of outboard motors frequently desire to transport the motors back and forth between their houses and the body of water on which they are to be used. Frequently in such cases, a substantial distance must be traversed between the body of water and the closest access thereto by an automobile.

Accordingly, this invention is directed to providing a collapsible cart especially adapted for the carrying of a heavy outboard motor with particular regard to supporting the motor in a manner in which the propeller and drive shaft depending a substantial distance below the motor are protected while carrying the motor in an upright position. Such an object indicates that the cart according to this invention must be of substantial height in use, and so it is desired that the cart itself be readily collapsible for storage or transporting in the limited space available in an automobile luggage space compartment or in an outboard motorboat itself, while being of sufficiently rigid construction to support and accommodate an outboard motor which, as is well-known, may weigh several hundred pounds or more.

The foregoing and other objects and advantages of this invention will be apparent from the following description, the accompanying drawing, and the appended claims.

In the drawing:

Fig. 1 is a side view of a cart embodying this invention in use having an outboard motor affixed thereto;

Fig. 2 is a front view of the cart of Fig. 1;

Fig. 3 is a side view of the cart of Fig. 1 indicating the manner in which the various elements thereof fold into collapsed condition;

Fig. 4 is a side view showing the cart in fully collapsed position; and

Fig. 5 is a fragmentary view on a somewhat larger scale showing in particular the clamping and interlocking means operable to hold a cart embodying this invention in operating or collapsed condition.

Referring to the drawing, in which like reference characters represent like reference parts throughout the several views thereof, a collapsible cart embodying this invention is shown as having a pair of upright members 10, each of which carries a handle portion 11 at the upper end thereof. Adjacent the handle portions 11, a cross-piece 12 is affixed between upright members 10. Cross-piece 12 may satisfactorily be of wood and of a height and thickness adapted readily to accommodate the conventional clamp 13 at one side of an outboard motor 14 generally used for affixing the outboard motor to the stern of an outboard motorboat. The lower end of upright members 10 terminate in joints 15, hereinafter described in more detail, approximately midway of the overall height of the cart.

Depending from joints 15 are two substantially upright wheel-carrying bars 20 carrying between the lower ends thereof an axle 21 on which are mounted wheels 22 at either side of the cart. Also depending from joints 15 are two additional uprights 25 having a substantially right angular portion 26 at the lower ends thereof between the extremities of which is a cross-bar 27. In a preferred embodiment of this invention, the uprights 25, portions 26 and cross-bar 27 are satisfactorily formed of a single piece of tubular stock, the aforementioned members 10, 11, and 20 are also satisfactorily formed of lengths of tubular stock.

As indicated in Fig. 1, the lengths of wheel-carrying uprights 20 and uprights 25 are coordinated with the length of uprights 10 and the positioning thereon of cross-bar 12 so that, with an outboard motor 14 affixed thereto as indicated, the portion 26 will be sufficiently below cross-bar 12 to extend below and protect the propeller and drive shaft housing 30 depending from outboard motor 14. The length of these members is also coordinated so that, as indicated in Fig. 1, the portion 26 forms a rest to support the cart in vertical position in cooperation with wheels 22, yet, upon tilting the top of the cart to the left in Fig. 1 by grasping the handles 11, the cart and outboard motor thereon may be readily wheeled about as desired.

Also mounted on the joints 15 is a substantially U-shaped bracket 31 which is extended to horizontal position when the cart is upright and is adapted to form a shelf to carry a separate gas tank 32 or other auxiliary equipment for motor 14.

As will be noted from the foregoing, the principal elements of the cart are all joined at the joints 15. As shown in more detail in Fig. 5, these joints 15 are identical on either side of the cart, and each is made up of two side plates 35 with the members 10, 20 and 25 affixed therebetween. Plates 35 are rigidly bolted to the members 10 by bolts 36 passing therethrough. Members 20 and 25 are pivotally connected between plates 35 by pivot pins 37 and 38, respectively, for free pivotal movement between plates 35 into and out of alignment parallel with uprights 10.

Bracket 31 is pivotally connected through plates 35 and uprights 10 as by bolts 39, and this arrangement, as shown in Fig. 5, also provides that the heads of pivot pins 37 form a stop or abutment adjacent the bolted ends of bracket 31 to limit its downward pivoting movement to a position where bracket 31 assumes the horizontal position noted in Fig. 1—i.e., forming a right angle with respect to uprights 10.

At each of the joints 15 and bleow the plates 35 thereof are positioned two corrugated clamp members 40 shaped to fit around and interlock with all of the uprights 10, 20 and 25. At each of the sides of the cart two of these clamp members 40 are held in position by a bolt 41 passing therethrough and through the lower end of upright 10 and a wingnut 42 or other readily releasable fastening means.

As will be apparent, particularly from the exploded view of Fig. 5, loosening wingnut 42 to slacken bolt 41 sufficiently to separate clamp members 40 by a distance slightly greater than the diameters of members 10, 20 and 25 enables the cart to be collapsed. That is, with the clamp members 40 separated but, because of the extra length of bolts 41, not necessarily completely detached from the cart, the wheel carrying uprights 20 can be folded upwardly as indicated by the arrows in Fig. 3, as can both uprights 25 and bracket 31 so that the entire cart can be collapsed into little more than one-half of its overall height as indicated in Fig. 4 for ready storage or transportation. Yet, when in the position shown in Fig. 5 with clamp members 40 tightly locked in place by bolts 41, the curved or corrugated configuration of clamp members 40 interlocking with uprights 10, 20 and 25 in the position shown holds the entire cart rigidly in extended position supporting the entire weight of outboard motor 14 and protecting the depending drive housing 30 while the motor is transported on the cart. Also, as will be noted, the collapsing or extending of the cart is accomplished by loosening or tightening a single pair of wingnuts 42 without the necessity of other assembly or disassembly operations. Also, notwithstanding the free pivotal movement of members 20 and 25 about their respective pivot pins 37 and 38, the provision of clamp members 40 of substantial width and shape as indicated gives adequate interlocking and rigidifying support for the entire device.

It will, accordingly, be seen that a structure is provided by this invention which is readily collapsible by the simple loosening of a single pair of fastening means and yet which, when in extended position, is capable of supporting, storing and transporting a full size outboard motor and auxiliary equipment therefor such as a separate gas tank and so doing by supporting the motor by its conventional supporting clamp in the manner and positioning for which it was designed. Notwithstanding its rigid structure and adequate strength and height to support a heavy motor in this manner, the cart is readily collapsible to little more than half its length and is itself of relatively light weight for easy storage and carrying.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. A collapsible cart of the character described for transporting an outboard motor mounted thereon in the normal operating position of said motor and comprising in combination a pair of substantially upright frame members, a cross beam interconnecting said frame members for mounting of said motor thereon, handle portions at one end of said frame members, a pair of wheel-carrying legs, means for pivotally mounting said legs on said frame members adjacent the ends thereof opposite to said handle portions for pivoting movement of said legs from an extended position substantially aligned with said frame members to a collapsed position in which said legs are folded back substantially against said frame members, a pair of supporting members for supporting said cart stationarily in an upright position and for protecting lower portions of said motor, means for pivotally mounting said support members on said upright frame members adjacent said pivotal mounting of said wheel-carrying legs for pivoting movement from an extended position substantially aligned with said upright frame members to a collapsed position folded back substantially against said upright frame members, and means for releasably interlocking said frame, leg, and support members to maintain said members rigidly in said extended positions thereof.

2. A collapsible cart of the character described for transporting an outboard motor mounted thereon in the normal operating position of said motor and comprising in combination a pair of substantially upright frame members, a cross beam interconnecting said frame members for mounting of said motor thereon, handle portions at one end of said frame members, a pair of wheel carrying legs, means for pivotally mounting said legs on said frame members adjacent the ends thereof opposite to said handle portions for pivoting movement of said legs from an extended position substantially aligned with said frame members to a collapsed position in which said legs are folded back substantially against said frame members, a pair of supporting members having a right angle foot portion at one end thereof for supporting said cart stationarily in upright position and for protecting lower portions of said motor, means for pivotally mounting said support members adjacent the ends thereof opposite to said right angle foot portions on said upright frame members adjacent said pivotal mounting of said wheel carrying legs for pivoting movement from an extended position substantially aligned with said upright frame members to a collapsed position folded back substantially against said upright frame members, and means for releasably interlocking said frame, leg, and support members to maintain said members rigidly in said extended positions thereof.

3. A collapsible cart of the character described for transporting an outboard motor mounted thereon in the normal operating position of said motor and comprising in combination a pair of substantially upright frame members, a cross beam interconnecting said frame members for mounting of said motor thereon, handle portions at one end of said frame members, a pair of wheel-carrying legs, means for pivotally mounting said legs on said frame members adjacent the ends thereof opposite to said handle portions for pivoting movement of said legs from an extended position substantially aligned with said frame members to a collapsed position in which said legs are folded back substantially against said frame members, a pair of supporting members for supporting said cart stationarily in an upright position and for protecting lower portions of said motor, means for pivotally mounting said support members on said upright frame members adjacent said pivotal mounting of said wheel-carrying legs for pivoting movement from an extended position substantially aligned with said upright frame members to a collapsed position folded back substantially against said upright frame members, and means for releasably interlocking said frame, leg, and support members to maintain said members rigidly in extended positions thereof, an extended bracket forming a shelf on the side of said cart opposite to that occupied by said motor, and means for pivotally mounting said bracket on said frame members for pivoting movement from an extended position substantially at right angles with said frame members to a folded position substantially parallel to said frame members.

4. A collapsible cart of the character described for transporting an outboard motor mounted thereon in the normal operating position of said motor and comprising in combination a pair of substantially upright frame members, a cross beam interconnecting said frame members for mounting of said motor thereon, handle portions at one end of said frame members, a pair of wheel-carrying legs, means for pivotally mounting said legs on said frame members adjacent the ends thereof opposite to said handle portions for pivoting movement of said legs from an extended position substantially aligned with said frame members to a collapsed position in which said legs are folded back substantially against said frame members, a pair of supporting members for supporting said cart stationarily in an upright position and for protecting lower portions of said motor, means for pivotally mounting said support members on said upright frame members adjacent said pivotal mounting of said wheel-carrying legs for pivoting movement from an extended position substantially aligned with said upright frame members to a collapsed position folded back substantially against said upright frame members, and means for releasably interlocking said frame, leg, and support members to maintain said members rigidly in extended positions thereof, an extended bracket forming a shelf on the side of said cart opposite to that occupied by said motor, means for pivotally mounting said bracket on said frame members for pivoting movement from an extended position substantially at right angles with said frame members to a folded position substantially parallel to said frame members, and stop means for limiting said pivoting movement of said bracket to said extended and folded positions with respect to said frame members.

5. A joining and interlocking construction for interconnecting movable parts in a collapsible cart of the character described having a frame member with respect to which wheel-carrying leg and support members are mounted for pivotal movement selectively from extended positions substantially aligned with said frame member to collapsed positions folded back substantially against said frame member, comprising a pair of plates rigidly mounted on opposite sides of said frame member for receiving said leg and support members, means for pivotally mounting said leg member and support members between said plates for pivoting movement of said members, clamp brackets for enclosing said members therebetween preventing said pivoting movement of said members out of said extended positions thereof, and means for releasably securing said clamp brackets tightly together effecting rigid interlocking of all said members in said extended positions thereof.

6. A joining and interlocking construction for interconnecting movable parts in a collapsible cart of the character described having a frame member with respect to which wheel carrying leg and support members are mounted for pivotal movement selectively from extended positions substantially aligned with said frame member to collapsed positions folded back substantially against said frame member, comprising a pair of plates rigidly mounted on opposite sides of said frame member for receiving said leg and support members, means for pivotally mounting said leg member and support members between said plates for pivoting movement of said members, clamp brackets for enclosing opposite sides of all said members therebetween, said clamp brackets substantially surrounding said leg and support members in clamping position preventing said pivoting movement of said members out of said extended positions thereof, and means for releasably securing said clamp brackets tightly together effecting rigid interlocking of all said members in said extended positions thereof.

7. A joining and interlocking construction for interconnecting movable parts in a collapsible cart of the character described having a frame member with respect to which wheel carrying leg and support members are mounted for pivotal movement selectively from extended positions substantially aligned with said frame member to collapsed positions folded back substantially against said frame member, comprising a pair of plates rigidly mounted on opposite sides of said frame member and forming therebetween channels on opposite sides of said frame member for receiving said leg and support members therein, means for pivotally mounting said leg member in one of said channels and said support member in the other of said channels for pivoting movement of a portion of each of said members into and out of said channels, a pair of clamp brackets for enclosing opposite sides of all said members therebetween, said clamp brackets substantially surrounding said leg and support members in clamping position preventing said pivoting movement of said members out of said extended positions thereof in said channels, and means for releasably securing said clamp brackets tightly together effecting rigid interlocking of all said members in said extended positions thereof and releasing of said members for movement out of said extended positions to said collapsed positions thereof upon loosening and separation of said clamp brackets.

References Cited in the file of this patent

UNITED STATES PATENTS

| | | |
|---|---|---|
| 2,450,304 | Shiflet | Sept. 28, 1948 |
| 2,599,354 | Stableford | June 3, 1952 |
| 2,620,021 | Molla | Dec. 2, 1952 |
| 2,640,934 | Lago | June 2, 1953 |

FOREIGN PATENTS

| | | |
|---|---|---|
| 584,591 | Great Britain | Jan. 17, 1947 |
| 645,944 | Great Britain | Nov. 15, 1950 |